(No Model.) 3 Sheets—Sheet 1.
E. K. DUTTON.
ROAD LOCOMOTIVE.
No. 587,714. Patented Aug. 10, 1897.
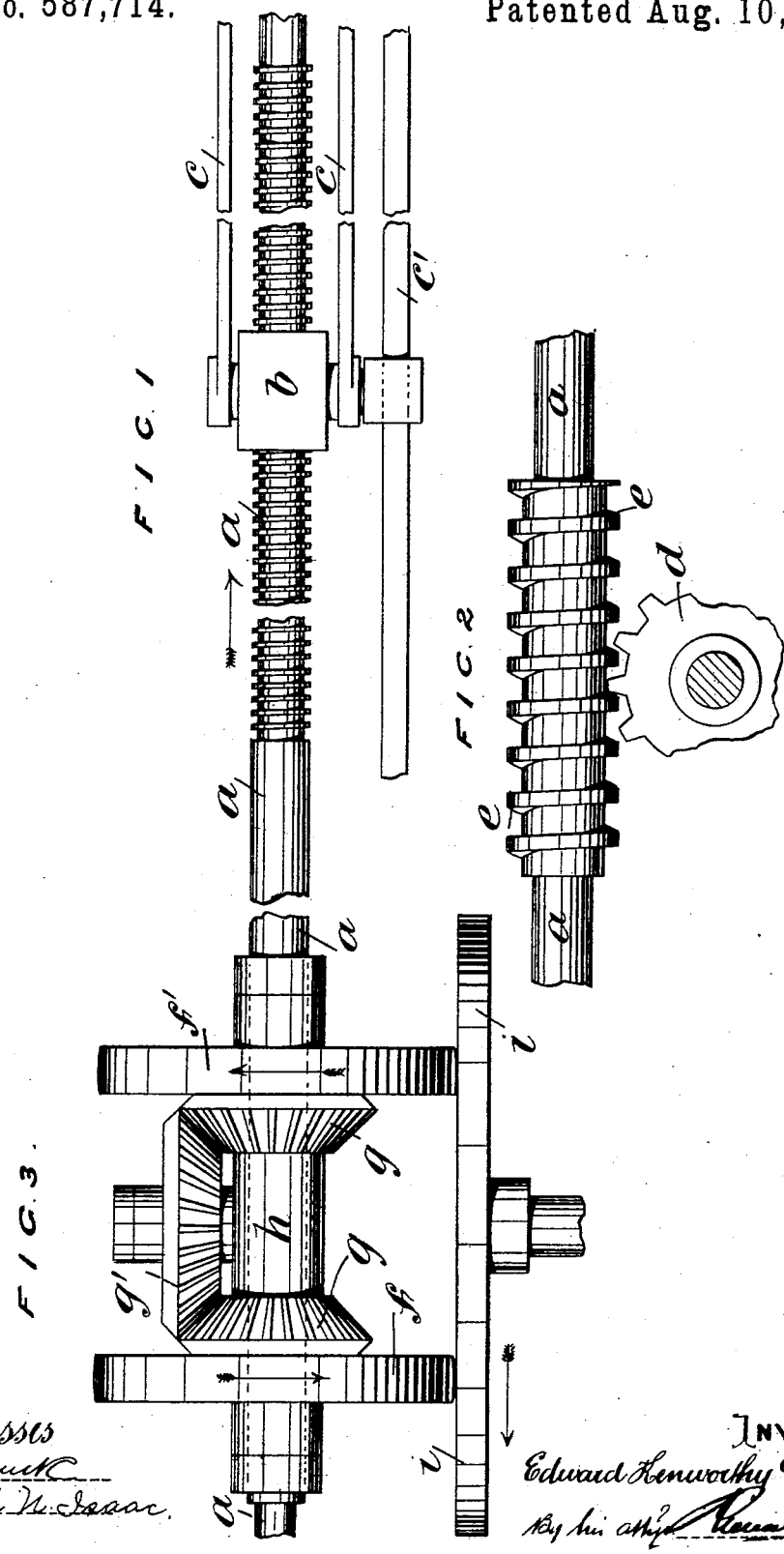
Witnesses
Inventor.
Edward Kenworthy Dutton
By his atty

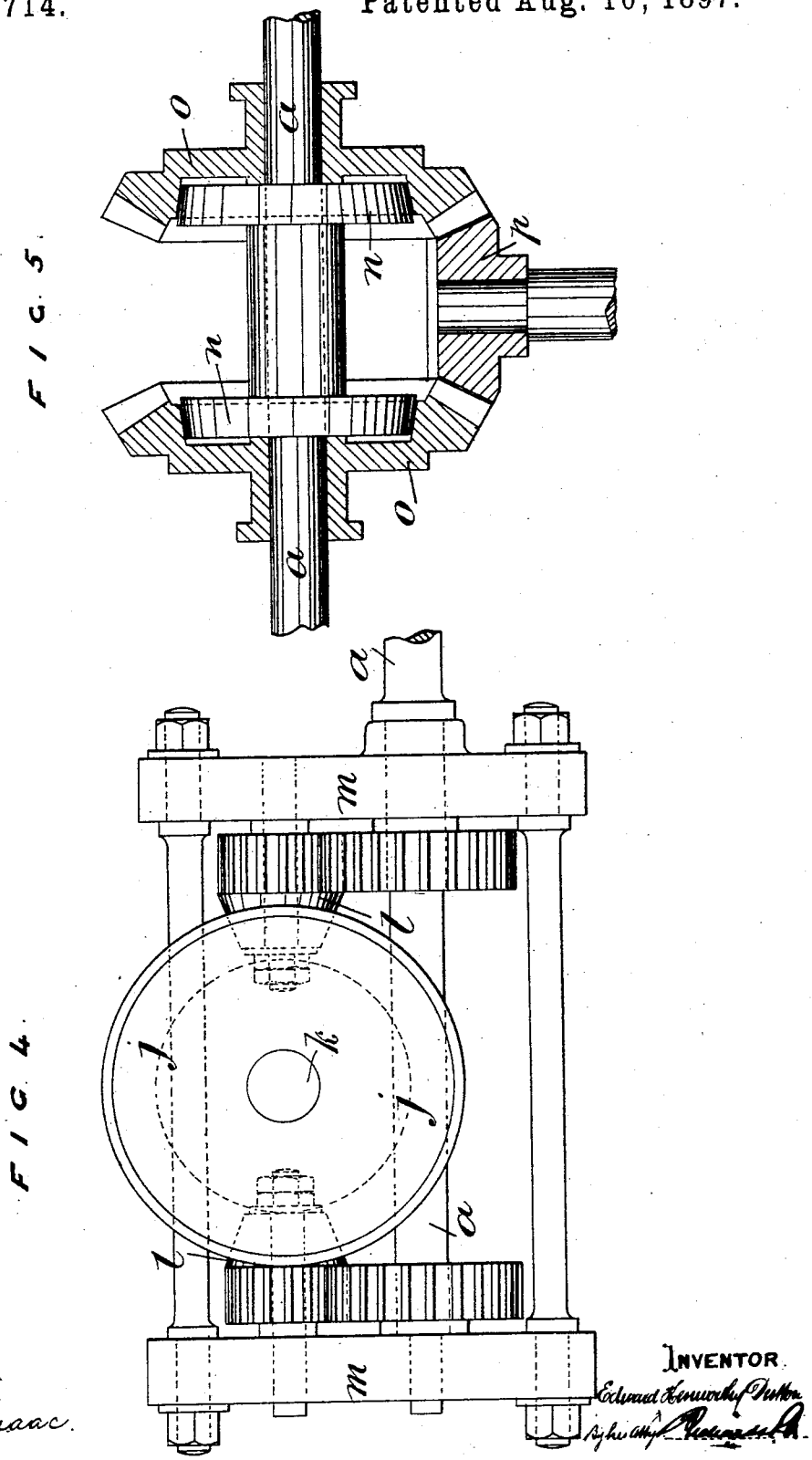

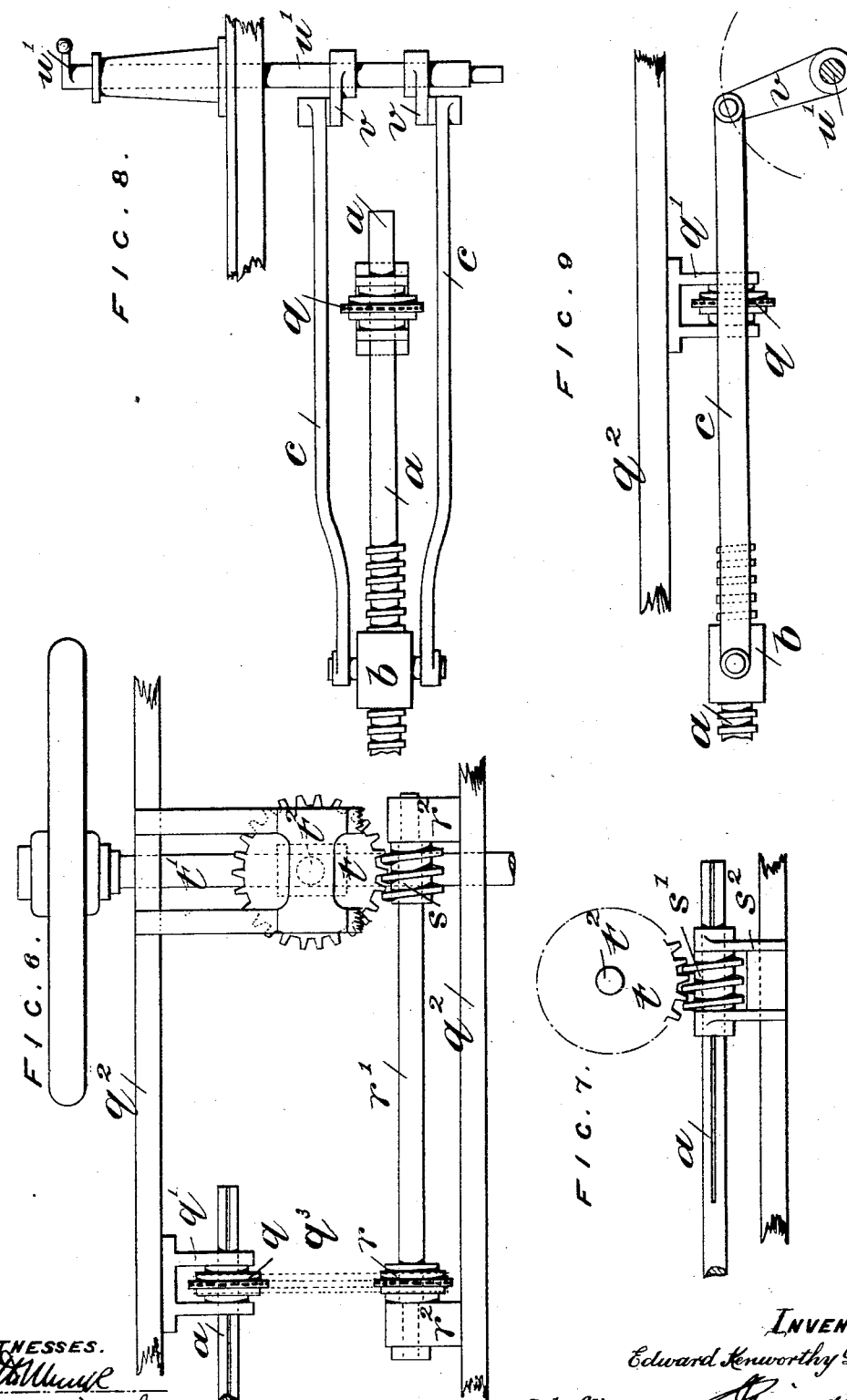

UNITED STATES PATENT OFFICE.

EDWARD KENWORTHY DUTTON, OF HARROGATE, ENGLAND.

ROAD-LOCOMOTIVE.

SPECIFICATION forming part of Letters Patent No. 587,714, dated August 10, 1897.

Application filed January 6, 1897. Serial No. 618,193. (No model.) Patented in England June 6, 1896, No. 12,379.

*To all whom it may concern:*

Be it known that I, EDWARD KENWORTHY DUTTON, a subject of the Queen of Great Britain, residing at Arden, Cornwall Road, Harrogate, York county, England, have made certain new and useful Improvements in Road-Locomotives and Motor-Vehicles, of which the following is a specification.

The invention has been patented in England, No. 12,379, dated June 6, 1896.

My invention relates to vehicles provided with motive mechanism and to locomotives, such as traction-engines and road-rollers. I employ friction reversing-gearing to aid in the steering of such vehicles and locomotives, such gearing being brought into action by an endwise-sliding shaft, which when revolving tends to work back.

The accompanying drawings are illustrative of my invention.

Figure 1 represents a part of the said sliding shaft and of the parts for effecting the sliding of the same. Fig. 2 shows another method of effecting the sliding of the said shaft. Fig. 3 represents a frictional reversing motion which may be used in combination with the said sliding shaft. Fig. 4 represents another form of reversing-gear. Fig. 5 represents a third form of reversing-gear. Fig. 6 is a plan view showing the connection between the shaft and the steering-axle. Fig. 7 is a modified form of connection. Figs. 8 and 9 illustrate the connection between the shaft and the steering head or lever.

In Fig. 1, $a$ represents a shaft which is mounted to revolve in suitable bearings and also to slide endwise in either direction in such bearings, or the said shaft may be carried by a sliding carriage. A portion of this shaft is cut with a screw-thread, and a nut $b$ engages with such thread. This nut would be connected with the ordinary steering-shaft of the vehicle in any suitable manner, so that the nut could be acted upon to slide the shaft $a$ endwise in either direction. In the example side links $c\ c$ are supposed to connect the nut $b$ with a lever upon the steering-shaft of the vehicle, but as the parts for connecting the nut with the steering-shaft may be greatly varied they are not shown in the drawings.

In Fig. 2 the endwise movement of the shaft is effected by means of a worm-wheel or sector $d$, which engages with a long worm or screw $e$ upon the shaft $a$.

The worm-wheel $d$ may be fixed upon the steering-shaft of the vehicle or be connected with it by suitable means. When the said worm-wheel is turned in either direction, it causes an endwise movement of the shaft $a$. The said shaft or a shaft coupled to the same is supposed to extend through the parts in Fig. 3, wherein the said shaft is seen passing through two friction-wheels $f\ f'$, which are mounted to revolve loosely upon the said shaft and are connected by bevel-wheels $g\ g'$. The intermediate wheel $g'$ is carried by a block $h$, which is fast to the shaft.

The two friction-wheels are in contact with a disk $i$, which receives a rapid revolving motion, say in the direction indicated by the arrow from the motor of the vehicle, whereby the two friction-wheels are revolved in contrary directions. So long as the two wheels are equidistant from the center of the disk the shaft $a$ will remain at rest. Supposing that the said shaft is moved endwise in the direction indicated in Fig. 1, so as to bring the wheel $f$ nearer to and the wheel $f'$ farther from the disk-center, the shaft $a$ will be revolved in the indicated direction.

It will be seen that by reason of the screw working in the nut the shaft will slide back, so that the two friction-wheels will be shifted back to their normal positions and the revolving movement of the shaft will cease.

By sliding the shaft in the contrary direction the shaft will be revolved in the contrary direction. The result of the described action of the parts is that when the driver of the vehicle moves his steering-lever the friction-gear turns the shaft $a$ in the direction and to the extent determined by the movement of the lever, and then ceases to act upon the shaft until the driver moves his lever back or imparts a further movement to the lever.

The shaft $a$ may be connected with a worm in gear with a worm-wheel upon the lockingcarriage of the vehicle or may be connected with any suitable parts adapted to put the vehicle-wheels in the required positions.

It will be understood that if the last-named worm is upon the shaft $a$ such shaft must be free to slide in such worm without moving it endwise. A bar $c'$ or other means is or are employed to keep the nut $b$ from revolving with the shaft.

Fig. 4 shows an arrangement adapted for cases wherein the shaft $a$ could not extend across the axis of the shaft actuating the reversing-gear. A bevel-wheel $j$ is fixed upon a shaft $k$, which revolves when the vehicle is in motion. With the wheel $j$ either of two friction-wheels $l\ l$ may be caused to engage by sliding the frame $m$ in one direction or the other. This sliding movement is derived from the shaft $a$, which is mounted in the frame $m$, or is coupled to a shaft so mounted, and is connected with the friction-wheels $l\ l$ by the gear-wheels $l'\ l'$. It will be seen that the revolution of the shaft $a$ will only continue so long as the said shaft is moved endwise in either direction.

In Fig. 5 the shaft $a$ carries a pair of friction-cones $n\ n$, which are adapted to engage with hollow cones which are formed in bevel-wheels $o\ o$ and are connected by an intermediate bevel-wheel $p$, the parts constituting a friction-clutch-reversing motion. The action is the same as that of Fig. 4, either clutch being put in action by sliding the shaft $a$ and disengaging itself immediately the movement of the steering-lever ceases. Such a motion is suitable for heavy vehicles or for cases wherein the driving-shaft actuated by the motor or vehicle does not revolve rapidly.

I have only illustrated the gear in Figs. 4 and 5 as examples of suitable gear for my purposes, and do not claim them as novel, apart from their combination with the shaft $a$ as arranged to act.

An arrangement for connecting the shaft $a$ with the steering-wheels is illustrated by Figs. 6 and 7, and a method for connecting the said shaft $a$ with the steering lever or handle is shown in Figs. 8 and 9, Fig. 8 being a vertical view and Fig. 9 a plan.

In Fig. 6, $a$ is the end of the shaft, (marked with the same letter in the previous figures.) This shaft slides in a sprocket-wheel $q$ and also slides and revolves in a bearing-bracket $q'$, carried by any suitable part of the carriage-framing, a part of such framing being represented by $q^2$. The bracket $q'$ permits the wheel $q$ to revolve, but prevents it from sliding with the shaft. The said wheel is connected by a chain $q^3$ with a second sprocket-wheel $r$, which is fixed upon a shaft $r'$, which revolves in bearings $r^2$, and is provided with a worm $s$, which gears with a worm-wheel $t$, which is connected with the wheel-axle $f'$ of the carriage, so that when the worm-wheel $t$ turns upon its axis at $t^2$ the axle $t'$ swivels about this center, so as to effect the steering of the carriage.

In a modification shown in Fig. 7 the worm $s'$ is mounted in a bracket $s^2$, as in the case of the wheel $q$, and the shaft $a$ slides in the worm. In either case a long groove in the shaft $a$ may act upon a key in the wheel or worm to revolve the same.

In Figs. 8 and 9, $u$ represents the steering-lever of the vehicle and may be of any suitable form. This lever in the example is fixed upon the upper end of a shaft $u'$, which carries a pair of levers $v$, which are jointed to the ends of the links $c\ c$, being the same links which appear in Fig. 1, but the ends which appear to be broken off in Fig. 1 are represented in Fig. 8. When the steering-lever $u$ is moved in either direction, the shaft $a$ is caused to slide in its bearings. The effect of the shaft $a$ so sliding would be to cause it to revolve in one direction or the other, as already described when referring to Figs. 1, 3, and 5, and the said shaft, acting through the parts $q$, $r$, $r'$, $s$, and $t$, would cause the carriage-axle $t'$ to be moved into the positions required for the steering of the carriage, as is well understood. I prefer to so proportion the gears with relation to the screw-thread on the shaft $a$ as that the axle $t'$ shall follow the same angular movement as the steering-lever $u$—that is to say, supposing the steering-lever and the axle to be both in a square line across the carriage and the said lever to be moved through an angle of ten degrees, the axle would move through the same angle and then remain in the position until the lever would be again moved. An advantage of such a correspondence is that the position of the steering-lever always indicates the true position of the axle $t'$, so that the driver of the carriage can steer with more assurance, especially when turning sharp corners.

What I claim as my invention is—

1. In combination in a motor-vehicle, the longitudinally-movable shaft $a$, means for setting said shaft in its positions longitudinally, an adjustable driving-gear arranged to be set by the longitudinal movement of said shaft, said gearing being connected to the shaft to rotate the same and connections from the said shaft to the part of the vehicle to be operated by the gearing, substantially as described.

2. In combination with the motor-vehicle, the longitudinally-movable shaft, the driving-gearing therefor arranged to be set by the longitudinal movement of the shaft, means for moving the shaft back to normal position as it is rotated by the gearing whereby said gearing and shaft are rendered inactive, and a connection between the shaft and the part of the vehicle to be operated, substantially as described.

3. In combination the shaft $a$ movable longitudinally the gearing for rotating the same arranged to be set by the longitudinal movement of said shaft, the nut engaging the screw-threads of the shaft for returning the same with the gearing to normal position as it is rotated, and means for moving the nut, substantially as described.

In witness whereof I have hereunto set my hand in presence of two witnesses.

EDWARD KENWORTHY DUTTON.

Witnesses:
CHAS. E. ATKINSON,
HARRY SUTCLIFFE.